APPARATUS FOR PRODUCING FIBERS FROM MOLTEN MATERIAL

Original Filed Aug. 24, 1959 4 Sheets-Sheet 1

INVENTOR.
JOSEPH CORSENTINO
BY
Horace B. VanNaelkenburgh
ATTORNEY

APPARATUS FOR PRODUCING FIBERS FROM MOLTEN MATERIAL

Original Filed Aug. 24, 1959 4 Sheets-Sheet 2

INVENTOR.
JOSEPH CORSENTINO
BY
Horace B. Van Vachenhugh
ATTORNEY

APPARATUS FOR PRODUCING FIBERS FROM MOLTEN MATERIAL

Original Filed Aug. 24, 1959 4 Sheets-Sheet 3

INVENTOR.
JOSEPH CORSENTINO
BY
Horace B. Van Vaeckenburgh
ATTORNEY

APPARATUS FOR PRODUCING FIBERS FROM MOLTEN MATERIAL

Original Filed Aug. 24, 1959 4 Sheets-Sheet 4

INVENTOR.
JOSEPH CORSENTINO
BY
Horace B. Van Vackenburgh
ATTORNEY

United States Patent Office

Re. 25,306
Reissued Dec. 25, 1962

25,306

APPARATUS FOR PRODUCING FIBERS FROM MOLTEN MATERIAL

Joseph Corsentino, Belton, Tex., assignor, by mesne assignments, to Better Industries, Inc., Pueblo, Colo., a corporation of Massachusetts Original No. 2,992,453, dated July 18, 1961, Ser. No. 835,697, Aug. 24, 1959. Application for reissue July 23, 1962, Ser. No. 213,844
8 Claims. (Cl. 65—15)

Matter enclosed in heavy brackets [ ] appears in the original patent but forms no part of this reissue specification; matter printed in italics indicates the additions made by reissue.

This invention relates to apparatus for producing attenuated fibers from molten material, such as molten slag from which is made fibers of what is known as rock wool, an insulating material.

In the production of rock wool from slag, such as the residue of a smelter, a jet or plurality of jets of fluid, such as steam, [is] *may be* blown against [the] molten slag, to produce fibers. *Or, fibers may be formed by a rotary spinner and they may be directed into a blow chamber under the influence of steam. Some of the fibers may also be further attenuated by the steam.* When such fibers are produced, if sufficiently attenuated, they will cool relatively rapidly when collected, as on a belt *in a blow chamber.* Quite often in the past, all of the molten slag is not fiberized, but some of it is produced in the form of slugs or solid bodies of slag which remain heated for a considerable period of time. Thus, being protected by the fibers, themselves an insulating material, when packed in bags or formed as batts, such slugs tend to work their way to the edge of a body of fibers, either downwardly by gravity or through motion during movement, as during the packing process or transportation. Thus, such slugs may burn through a bag or may set fire to a freight car, truck, or other transportation equipment, so that the problem of fires produced by slugs has been a serious one.

In the production of such fibers, it is convenient to discharge a stream of molten slag against a rotating head, which throws the molten slag outwardly by centrifugal force, *as in the form of fibers, a substantial portion of fibers or molten material* and to direct a series of jets of fluid, steam being convenient, against the outwardly traveling [molten slag] *material,* so as to produce fibers from as large a proportion of slag as possible. The steam jets are conveniently directed longitudinally of the axis of the rotating head, so that the fibers are blown longitudinally away from the head, from which they can fall onto a traveling belt. A trough for discharging the molten slag against the rotating head carries material at a relatively high temperature, while the molten slag on the rotating head also tends to heat parts in the immediate area, including the head. Obviously, the head may be cooled, as by circulating water therethrough, to protect the head. However, even with water cooling, maintenance problems of the head are considerable.

The steam jets are cnveniently issued from orifices in an annular steam ring, positioned adjacent the head, and thus adjacent the trough which carries the molten slag, so that the steam ring is subjected to considerable heat. Also, molten slag accidentally falling from the trough, or slugs which are thrown off the head, may collect on the steam ring. Being hollow, serious warpage and breakage problems are involved, since the steam ring may warp through expansion by the heat to which it is subjected, or may warp or break from localized heating due to molten slag *and/or slugs* accidentally deposited thereon.

Slugs are often caused by a non-uniform distribution of the molten slag on a rotating head, so that there is more [molten] material *discharged* at one point, or over one region, than the steam jets at that point or region can transform into fibers. Thus, if a more uniform distribution of the molten slag on the head can be secured, not only will the number of slugs in the final product be reduced, but also less damage to the head and less damage to the steam ring will be produced.

Among the objects of the present invention are to provide a novel apparatus for producing fibers from molten mineral, such as slag; to provide such apparatus which will produce a minimum of slugs or solid pieces of slag; to provide such apparatus which includes a novel rotating head for discharging the molten slag outwardly by centrifugal force; to provide such a head which assures an even distribution of the slag to the periphery of the head; *to provide such a head which produces fibers;* to provide such a head which is usable for long periods of time and which reduces maintenance problems; to provide such a head which includes means for forcibly directing cooling liquid, such as water, against the inside of the portion of the head which receives the molten slag; to provide such apparatus with which the operation may be readily controlled; and to provide such apparatus which may be operated effectively and efficiently.

Additional objects and the novel features of this invention will become apparent from the description which follows, taken in connection with the accompanying drawings, in which.

Figure 1:
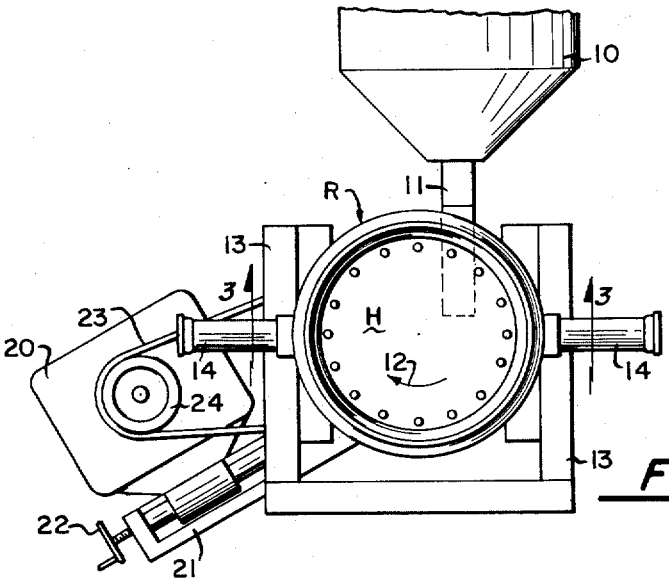
FIG. 1 is an end elevation of apparatus constructed in accordance with this invention and including particularly a novel rotating head or disc and a novel steam ring.
Figure 2:
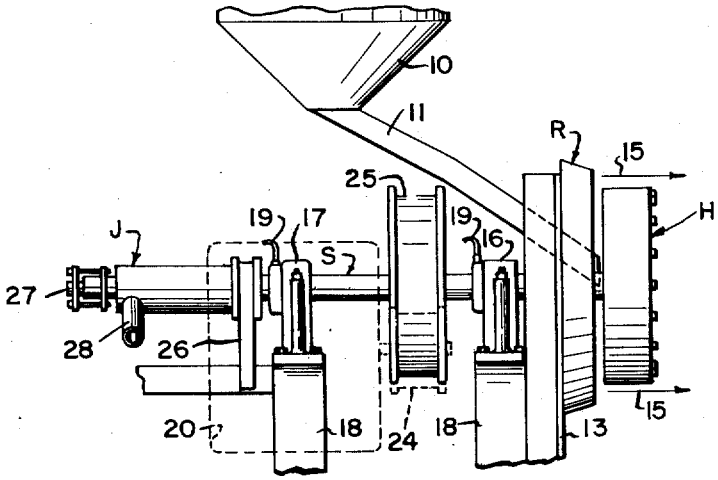
FIG. 2 is a side elevation of the apparatus of FIG. 1.

Apparatus constructed in accordance with this invention, as illustrated in FIGS. 1 and 2, may include a rotating head or disc H mounted on a shaft S, the head H being disposed below and forwardly of the lower end of a cupola 10, in which the molten slag is produced. The cupola 10 may be conventional, thus being provided with tuyeres for blowing air therein for combustion of coke, which is fed along with the slag into the top of the cupola, the heat of combustion of the coke melting the slag in a conventional manner. The molten slag flows by gravity from the lower end of the cupola 10 through a trough 11 for discharge of the molten slag against the inner end of head H. The lower end of trough 11 is preferably located alongside shaft S and in a position such that the molten slag, when head H is rotating in the direction of arrow 12 of FIG. 1, will be discharged against a downwardly moving portion of head H, for better distribution of the slag about the end of the head. A steam ring R, which has a greater diameter than the head and may be supported by standards 13, is positioned just forwardly of the head and may be provided at each side with an inlet pipe 14, which may be connected to a suitable source of steam, so that a plurality of jets of steam will be discharged longitudinally from steam ring R as in the direction of arrows 15 of FIG. 2, to impinge against the [molten slag] *material* discharged from the periphery of head H by centrifugal force and convert [the slag] into fibers *as much material, as possible, not already converted into fibers,* as well as blow the fibers longitudinally and past the head. The fibers may be collected in any suitable manner, but conveniently are permitted to fall onto a traveling belt, as of conventional wire mesh. A [shed] *blow chamber,* in which the belt travels, may be formed of relatively fireproof material and may extend over the belt and also to a position adjacent the head.

The shaft S may be supported for rotation by bearings 16 and 17, mounted on supports 18 and supplied with cooling water through piping 19. The shaft may be rotated by a motor 20, which is shown in phantom in FIG. 2 to permit other parts to be visible, adjustably mounted for movement toward and away from the shaft on a conventional adjustable support 21, the position of the motor being conveniently controlled by a hand wheel 22. The shaft S may be driven from the motor 20 through a belt 23 which, for convenience, is shown as a single belt engaging a pulley 24 mounted on the motor shaft and a pulley 25 mounted on the shaft S. However, it will be understood that a multiple belt drive, such as each belt being a V-belt, is preferable. Cooling water is supplied to head H and also discharged from the head through the hollow shaft S and for this purpose a water joint J, supported by a standard 26, may engage the end of the shaft opposite head H, the cooling water being supplied from a suitable source to an inlet 27 and discharged through an outlet 28.

Figure 3:
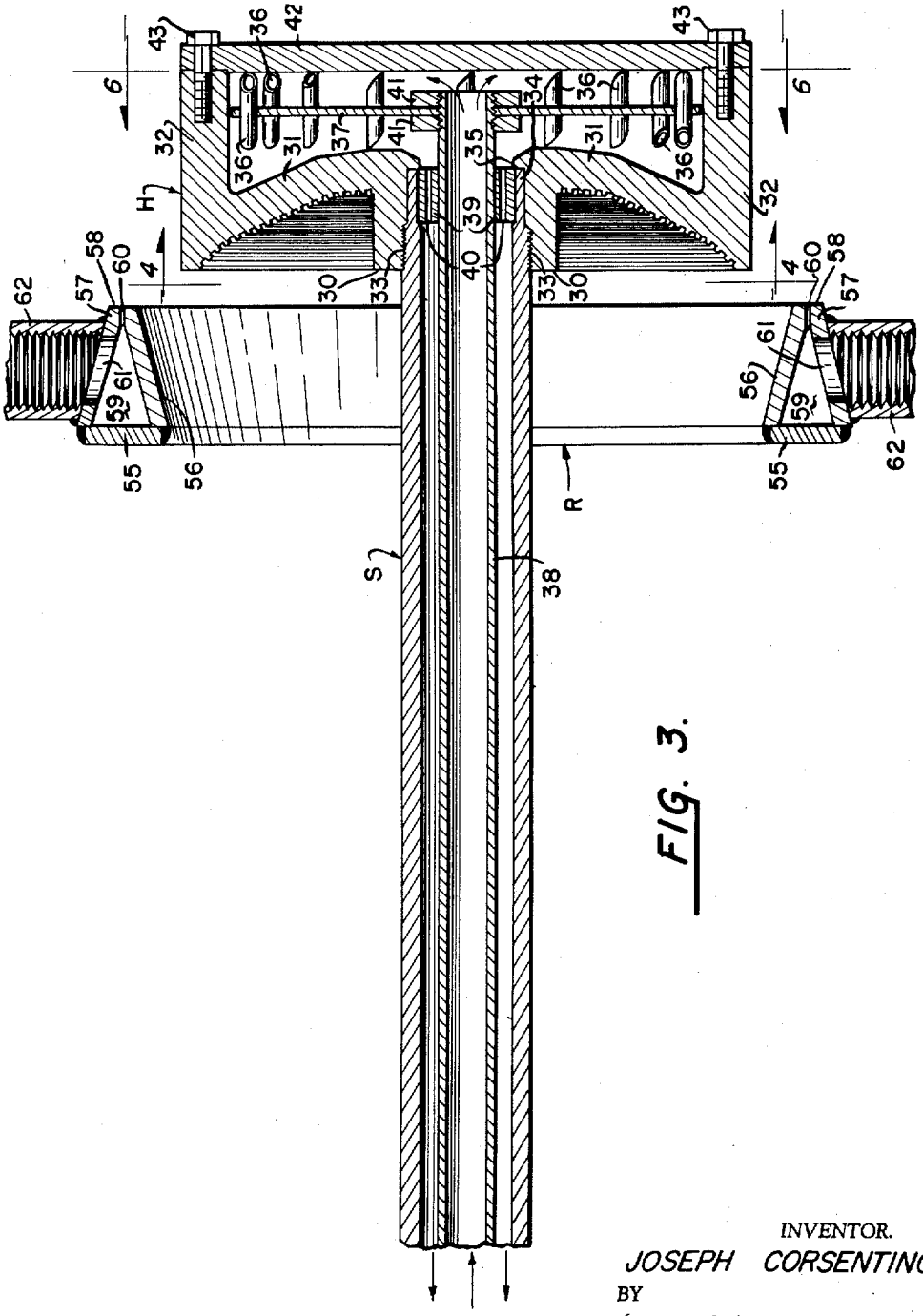
FIG. 3 is an enlarged fragmentary, horizontal longitudinal section, taken along line 3—3 of FIG. 1.

The head H of this invention, as shown in FIG. 3, may be formed from an annular block to provide a central hub 30 and a wall 31 which extends outwardly to a rearwardly extending, peripheral flange 32, the inner end or face of wall 31 being specially formed in a manner described later. Shaft S may be attached to hub 30, as by cooperating threads 33, the end 34 of the shaft being reduced in diameter and fitting into a corresponding portion of the hub for abutment against a shoulder 35 within the hub, also shown in FIG. 5. Head H, of course, rotates with shaft S and the direction of rotation, such as indicated by arrow 12 of FIG. 1, is such that the threads 33 will tend to be tightened during rotation. Cooling water is directed against wall 31 by a plurality of tubes 36 mounted in a circular plate 37, in a manner described later. Cooling water is supplied to head H through a pipe 38, disposed centrally of the hollow shaft S, and is also discharged within the shaft, flowing through the shaft around pipe 38, as indicated by the arrows. The head end of pipe 38 may be positioned in shaft S by an annular collar 39, having a plurality of longitudinal holes 40 therethrough, for the flow of discharged cooling water. Plate 37 may be attached to the end of pipe 38 by nuts 41, while the outer end of head H may be closed by a circular back plate 42, attached to the end of flange 32 by cap bolts 43.

Figure 4:
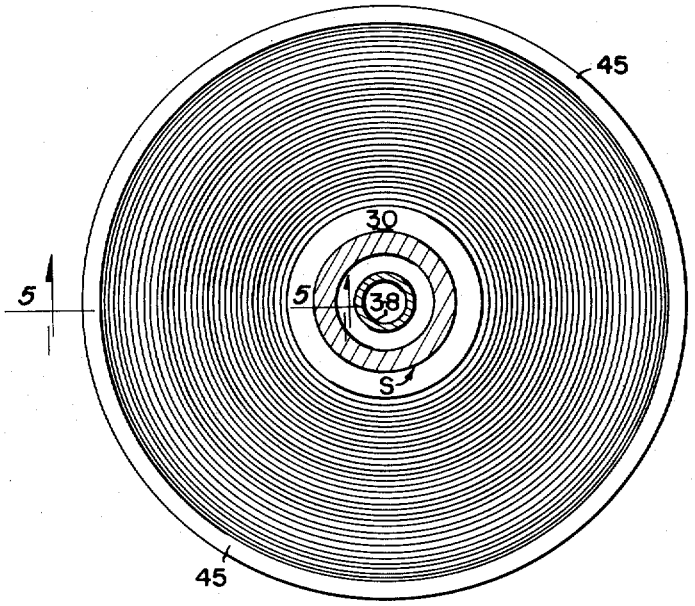
FIG. 4 is a front elevation of the head, with the shaft for the head in cross section, taken along line 4—4 of FIG. 3.
Figure 5:
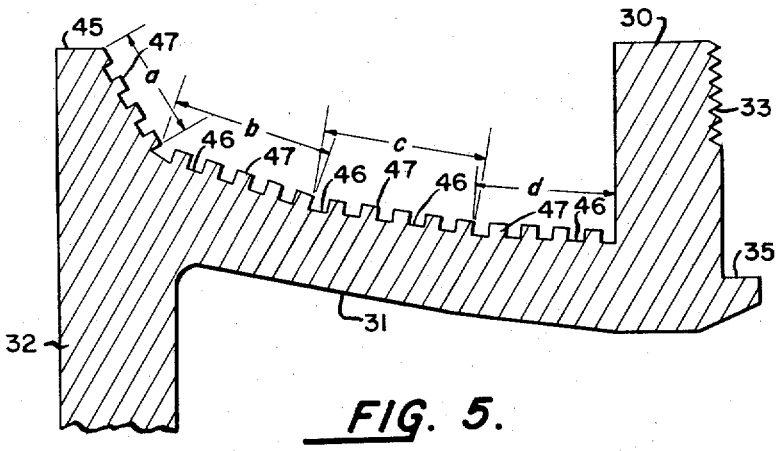
FIG. 5 is a further enlarged, partial cross section of the head, taken along line 5—5 of FIG. 4.

The inner end, or face of head H, as illustrated in FIGS. 4 and 5, is provided with an annular rim 45 and, between rim 45 and hub 30, is generally concave and provided with a series of annular grooves 46, preferably of equal depth and with equal spaces therebetween to form a series of annular ridges 47, all of grooves 46 being of equal depth but the depth of the grooves conveniently being slightly less than their width. For example, grooves and ridges each ⅛ in. wide and grooves having a depth of 3/32 in., have been used successfully. Prior to machining the grooves, the inner end of head H is machined so as to have several areas of different inclinations, as illustrated in FIG. 5, such as annular areas a, b, c and d of respectively lesser inclinations to a radius of the head. The annular areas, such as areas a, b, c and d, are further formed so that the included angle between successive areas decreases outwardly toward the rim, as will be evident from FIGS. 3 and 5. As used herein, the term "annular" refers to an area between two concentric circles or two approximately concentric circles, as distinguished from an area along a cylindrical surface. The opposite surface of wall 31 may be inclined away from a radius of the head as it approaches flange 32, to permit annular grooves 46 and annular ridges 47 to be cooled sufficiently to prevent damage thereto through the cooling water impinging against the opposite surface of wall 31 adjacent flange 32 and also traveling inwardly along this surface. Conveniently, wall 31 has nearly the same thickness throughout, but in a new head is made slightly thicker than necessary for strength, so that as the corners of ridges 47 become worn during use, due to flow of molten slag thereover, and thus become less effective, the old ridges may be machined off, new annular surfaces a, b, c and d produced and a new set of grooves 46 machined in the surfaces. When grooves 46 have a depth of 3/32 in., for instance, an additional thickness of wall 31 of only 3/16 to ¼ inch permits the head to be remachined twice before it is necessary to discard the same. Heads of this invention have been used for several months of continuous use, such as from 2 to 3 months, before it became necessary to remachine the head due to the corners of ridges 47 wearing off.

It cannot be emphasized too strongly that the corners of ridges 47 are essential to the successful operation of the head, since as indicated above, when the corners become rounded off, such as to a radius approximating half the depth of grooves 46, the desired distribution of slag was no longer obtained. Although the preferred angularity of the corners of ridges 47 is 90°, some variation in this angularity is permissible. Stated in another way, the sides of each ridge 47 are preferably perpendicular to the bottoms of the adjacent grooves 46, except at the points of intersection of the respective areas a, *b* c and d, but a variation of a few degrees from such a perpendicular, in either direction, is permissible. Nevertheless, if ridges 47 have too pronounced a trapezoidal shape, the inclination of the sides of the ridges away from the perpendicular may approximate the condition which occurs when the corners have been rounded off to a radius of about one-half the depth of the grooves and therefore render the head unfit for use. Also, such inclination away from the perpendicular will mean that the ridges will sooner wear to a condition equivalent to such rounding off and therefore the head will have a much shorter useful life before remachining is required.

As an example of an operative head of the present invention, but not in limitation thereof, a head having the following dimensions has been used quite successfully, being adequately operative for periods of two to three months before remachining was required. Such a head had an outside diameter of 12½ in., with hub 30 being 3¾ in. in outside diameter and wall 31 initially having a general thickness of ¾ in. The flange 32 was 3⅞ in. from front to back and ¾ in. thick, while back plate 42 was 5/16 in. thick and plate 37 was ⅛ in. thick, with rim 45 being ⅜ in. wide. Annular area a was ⅞ in. wide, along an angle of 60° to a radius of the head; annular area b was 1¼ in. wide along an angle of 20° to a radius of the head; annular area c was 1¼ in. wide along an angle of 10° to a radius of the head; and annular area d was inclined at 5° to a radius of the head. Pipe 38 was ½ in. in nominal diameter, while shaft S had an inside diameter of 1½ in. and an outside diameter of 2 7/16 in. Pipe 38 was a conventional heavy steel pipe, while shaft S was formed of hot rolled mild steel, as was back plate 42, collar 39 and the main block of the head comprising hub 30, wall 31 and flange 32. Plate 37 was formed of stainless steel, as were also tubes 37. It will be understood, of course, that other materials will be found suitable. It will also be understood that other dimensions may be used and also that a greater or lesser number of annular surfaces may be utilized, as well as variations in their angle of inclination, while different widths of the rim 45 may be used. For instance, the annular areas may have the inclinations indicated in FIG. 3, such as 45°, 20° and 5°, respectively, to a radius of the head, with a different extent than in FIG. 5. Also, the outer annular area may be inclined at as little as 30° to a radius of the head.

During the operation of head H, apparently the molten slag which is discharged against the head at the annular areas c and d will fill each of grooves 46 and be carried around the rotating head in each groove. Of course, as soon as a groove is filled, the slag will overflow the adjacent ridge and will be moved outwardly by centrifugal force into the next groove, and so on, until all of grooves 46 are filled and the slag will then flow outwardly through centrifugal force across rim 45 for discharge from the head to a point of interception with the steam jets discharged from steam ring R. It will be noted that as the slag proceeds further outwardly along the head, the peripheral speed at each successive point outwardly will increase due to the increase in radius. Thus, the increasing angularity to the radius of the head, of the annular areas d, c. b and a, respectively, apparently tends to cause the slag to move outwardly on the head in a more uniform pattern. Thus, the annular grooves and ridges apparently provide a more uniform distribution of the slag circumferentially of the head, while the grooves and ridges, in conjunction with the annular areas of increasing angularity in an outward direction, apparently produce a more uniform distribution of the slag radially of the head. It will be noted that the corner between rim 45 and annular area a can be rounded off, but that an axial shoulder of any real extent, between annular area a and rim 45, would be exceedingly detrimental and in fact would be likely to disrupt entirely the smooth flow of the molten slag over the surface of the head, through a buildup of slag at such an axial shoulder to nullify the flow control provided by the grooves and ridges and annular areas of increasing inclination outwardly. It is also to be emphasized that the molten material should be idrected toward the areas c and d although if the temperature of the molten slag should be reduced considerably, then the molten slag may be directed farther outwardly, such as onto area b, but the slag should not be directed against area a. As will be evident, variations of the temperature of the molten slag can be compensated for by moving the discharge point of the molten slag outwardly on the head, so that the temperature of the molten slag discharged from the head is not controlled by the amount of water cooling of the head, but rather by the position of the discharge of the slag onto the head.

Figure 6:
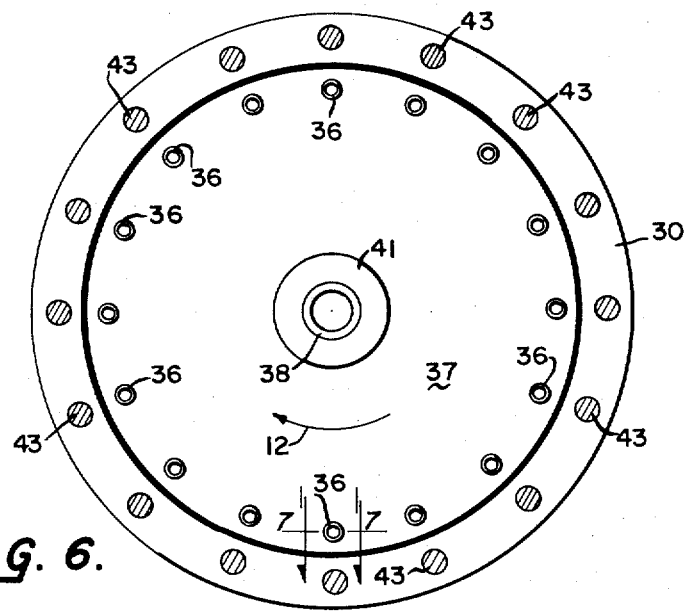
FIG. 6 is a vertical section, taken through the head along line 6—6 of FIG. 3.
Figure 7:
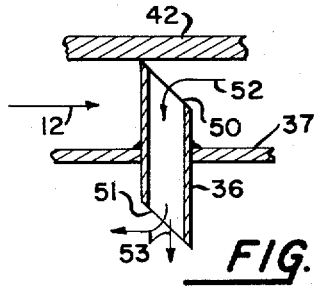
FIG. 7 is an enlarged, fragmentary cross section, taken along line 7—7 of FIG. 6, of a water directing tube and associated parts, disposed within the head.

Adequate water cooling of the head is accomplished by tubes 36 and the controlled flow of water within the head. In general, fresh cooling water is discharged from pipe 38 into the space between plate 37 and back plate 42, as indicated by the arrows in FIG. 3, and will be moved outwardly both by inlet pressure and by centrifugal force, to be picked up by tubes 36 and directed against wall 31 adjacent flange 32 and also inwardly, to flow inwardly along wall 31 for discharge through holes 40 in collar 39. Of course, head H is preferably completely filled with water during use, but tubes 36 tend to insure adequate circulation and particularly movement of cooling water against wall 31. For this purpose, tubes 36 are preferably equally spaced around plate 37, adjacent the periphery thereof, and, as shown in FIG. 7, are provided with beveled ends 50 and 51, with the point of each beveled end 50 as close as possible to back plate 42. Each tube 36 may be welded in position in a hole drilled for that purpose in tube 37, with bevel 50 facing in the direction of rotation, indicated by arrows 12 of FIGS. 6 and 7. As will be evident from FIG. 7, with tube 36 rotating in the direction of arrow 12, the water in the space between plate 37 and back plate 42 will be picked up through bevel 50, as indicated by arrow 52, and will thus flow longitudinally through tube 36. When reaching the opposite end of the tube, the water will be discharged, through bevel 51, so that it will not only be discharged against the adjacent surface of wall 31, adjacent flange 32, but also inwardly, as indicated by arrows 53. Thus, the water will be directed to flow against and inwardly along the surface of wall 31. As will be evident, by placing bevel 50 at the end of each tube 36 in the direction of rotation, pickup of the water by the tubes will be assured, so that the parallel bevel 51 at the opposite end of the tube, facing in the opposite direction, will discharge the water in a manner highly effective for cooling wall 31.

Figure 8:
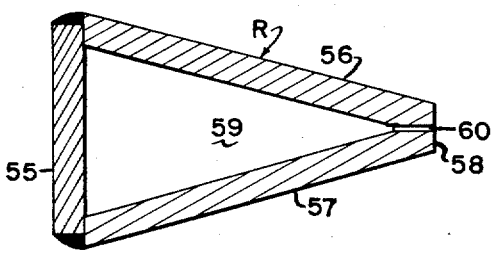
FIG. 8 is an enlarged cross section of the steam ring.

Although a head H, constructed in accordance with this invention, has reduced the amount of slugs thrown off by the head and therefore has reduced the warpage or breakage of the steam ring R caused by such slugs, at the same time, the steam ring R is subjected to considerable heat, particularly that portion of the steam ring directly above the trough 11. Thus, warpage problems were not eliminated by a previous type of steam ring, which comprised an annular back plate, two side plates, and a narrow front plate in which the orifices were drilled, all of the plates being welded together. However, a steam ring R appears to have solved the warpage difficulties, since such a steam ring has been operated for many months without difficulty. As illustrated in FIGS. 3 and 8, steam ring R comprises an annular back plate or ring 55 and a front ring machined from a single block of metal to provide rearwardly tapering side walls 56 and 57, with a relatively small included angle therebetween, such as approximately 30°, and a narrow front land 58. Side walls 56 and 57 are preferably of uniform thickness and steam space 59 enclosed by the back plate 55 and side walls 56 and 57 is thus generally triangular in shape. A series of orifices 60 are drilled inwardly from the center of the front land 58 and into the steam space 59, the orifices 60 being equally spaced about the periphery of the front land 58. For instance, a steam ring used with the head previously described, had 3/32 in. orifices spaced 3/16 in. apart in a circle having a diameter of 14¾ in. The back plate 55 is welded at its opposite edges to the respective side walls 56 and 57, the two parts of the steam ring thus being attached together by welds at the rear and back plate 55 thus resisting any tendency for the ring to warp out of shape. Of course, the fact that walls 56 and 57 are relatively elongated, in comparison with the distance between their rear ends, and particularly the fact that the walls 56 and 57 are integral, also appears to contribute markedly to the ability of the steam ring to resist any tendency for warpage, due either to local heating or to expansion and contraction between periods of use, such as during shutdowns. The relatively small angle between walls 56 and 57 causes the steam to be directed into orifices 60, which contributes to the effectiveness of the steam ring. In addition, the welds by which the two parts of the steam ring are attached together are in alignment, at opposite edges of the annular back plate 55, so that stresses imposed by welding are minimized.

On opposite sides of the steam ring R, as in FIG. 3, a hole 61 may be drilled in wall 57 and a threaded collar 62, having a beveled inner end to correspond to the inclination of wall 57, welded to the wall around the respective hole 61, to permit connection of pipe 14 of FIG. 1. In turn, pipe 14 may be connected to additional piping or to hoses through which steam is supplied from a suitable source thereof, such as a boiler.

From the foregoing, it will be evident that the apparatus of this invention fulfills to a marked degree the requirements and objects hereinbefore set forth. Due to the uniform distribution of the molten slag on the head, through the annular grooves and ridges and the successive outward greater inclination of annular areas to a radius of the head, particularly the decrease of the included angle between successive areas outwardly toward the rim, not only is the molten slag distributed uniformly circumferentially of the head, but the outward flow is also uniform. Thus, a minimum of slugs or solid pieces of slag are produced. *Also, because of this thin distribution of slag across the head, some fibers are produced directly by the head which may be further attenuated by the steam jets and conveyed into the blow chamber.* Due to the uniform distribution of molten slag and also the adequate water cooling of the head and particularly cooling of the wall in which the annular grooves and ridges are machined, maintenance problems are reduced and the head is useful for long periods of time. By machining the operating face of the head, to provide new annular areas and then machining the desired grooves therein, the head may be remachined to provide additional useful life. The forced circulation of water against the rear surface of the wall, on the front face of which the grooves and ridges are provided, permits a new head to have a wall of sufficient thickness that it may be remachined, but still permit the new head to be adequately cooled. Through the production of a minimum of slugs, not only is the quality of the final product increased, but also warpage and breakage problems of the steam ring are reduced. Also, variations in the temperature of the molten slag may be accommodated by shifting the position of the discharge of molten slag outwardly on the head, if the temperature of the molten slag should become lower.

For comparison purposes, a type of head used prior to the present invention required replacement quite often, sometimes as much as two or three times a week, whereas a head of the present invention has been found to have a normal life of two or three months prior to remachining. Also, the prior head would produce from 100 to 108 bags per hour of rock wool insulation, whereas the head of the present invention has produced from 160 to 180 bags per hour. The prior head produced batts averaging 38 lbs. in weight, due to the presence of slugs and shot in the rock wool, whereas the batts produced by the head of the present invention have averaged 35 lbs. in weight.

Although a preferred embodiment of this invention has been described and illustrated, and certain variations therein indicated, it will be understood that other embodiments may exist and that other variations may be made, all without departing from the spirit and scope of this invention.

What is claimed is:

1. In apparatus for producing fibers from molten material, including a rotatable head, means for rotating said head, means for discharging molten material against an end of said head, and means for discharging jets of fluid against [molten] material discharged centrifugally from said head, the improvement wherein said head is provided with a molten material receiving end having an annular outer rim and a series of concentric, annular grooves in a generally concave surface disposed inwardly of said rim, said grooves providing annular ridges therebetween and said grooves being formed in annular surface areas with the included angle between successive areas decreasing outwardly toward said rim.

2. In apparatus as defined in claim 1, wherein each edge of substantially each said ridge is generally perpendicular to the bottom of the adjacent grooves.

3. In apparatus as defined in claim 1, wherein said head is hollow and provided with an outwardly extending wall in the front surface of which grooves are formed; and means for directing cooling liquid against the inner surface of said wall.

4. In apparatus as defined in claim 1, wherein said annular areas include an outer annnular area adjacent said rim having an inclination of approximately 60° to a radius of said head; a next outer annular area having an inclination of approximately 20° to a radius of said head; a next outer annular area having an inclination of approximately 10° to a radius of said head; and an inner annular area having an inclination of approximately 5° to a radius of said head.

5. In apparatus as defined in claim 1, wherein said annular areas include an outer annular area adjacent said rim inclined at approximately 45° to a radius of said head; a next outer annular area inclined at approximately 20° to a radius of said head; and an inner annular area inclined at approximately 5° to a radius of said head.

6. Apparatus as defined in claim 1, wherein said annular areas include an outer annular area having an inclination of at least approximately 30° to a radius of said head.

7. In apparatus for producing fibers from molten material, including a rotatable head having an end surface adapted to receive molten material, a hollow shaft for rotating said head, and means for discharging jets of fluid against the [molten] material discharged peripherally from said head by centrifugal force, the improvement wherein said head is provided with an inner hub; a wall extending outwardly from said hub to an outer, rearwardly extending flange, the front surface of said wall being adapted to receive said molten material; a back plate spaced from said wall and closing the rear of said head; an inlet pipe for cooling liquid disposed within said hollow shaft and extending within said head to a position spaced from said back plate; an annular disc attached to said cooling liquid inlet pipe adjacent the end thereof; and means mounted on said annular disc for receiving cooling liquid in the space between said disc and back plate and discharging said cooling liquid against said wall.

8. In apparatus as defined in claim 7, wherein said means mounted on said annular disc comprises a plurality of tubes disposed circumferentially of said disc and extending therethrough, each tube having parallel beveled ends, with the bevel of the end of each tube adjacent said back plate facing in the direction of rotation of said head.

References Cited in the file of this patent or the original patent

| | | |
|---|---|---|
| 2,153,739 | Buss | Apr. 11, 1939 |
| 2,587,710 | Downey | Mar. 4, 1952 |
| 2,689,373 | Richardson | Sept. 21, 1954 |
| 2,793,395 | Richardson | May 28, 1957 |
| 2,855,626 | Firnhaber | Oct. 14, 1958 |
| 2,869,175 | Ebbinghonse | Jan. 20, 1959 |
| 2,884,659 | Powell | May 5, 1959 |
| 2,944,284 | Tillotson et al. | July 12, 1960 |